May 16, 1961 F. B. WAHL 2,984,175
PRESS
Filed June 11, 1959 2 Sheets-Sheet 1
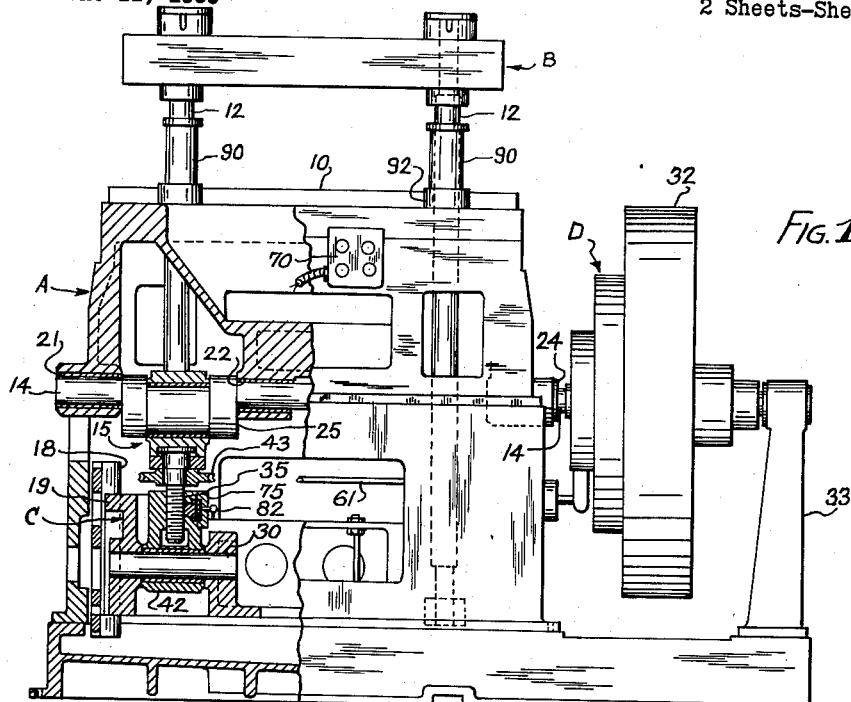
Fig. 1
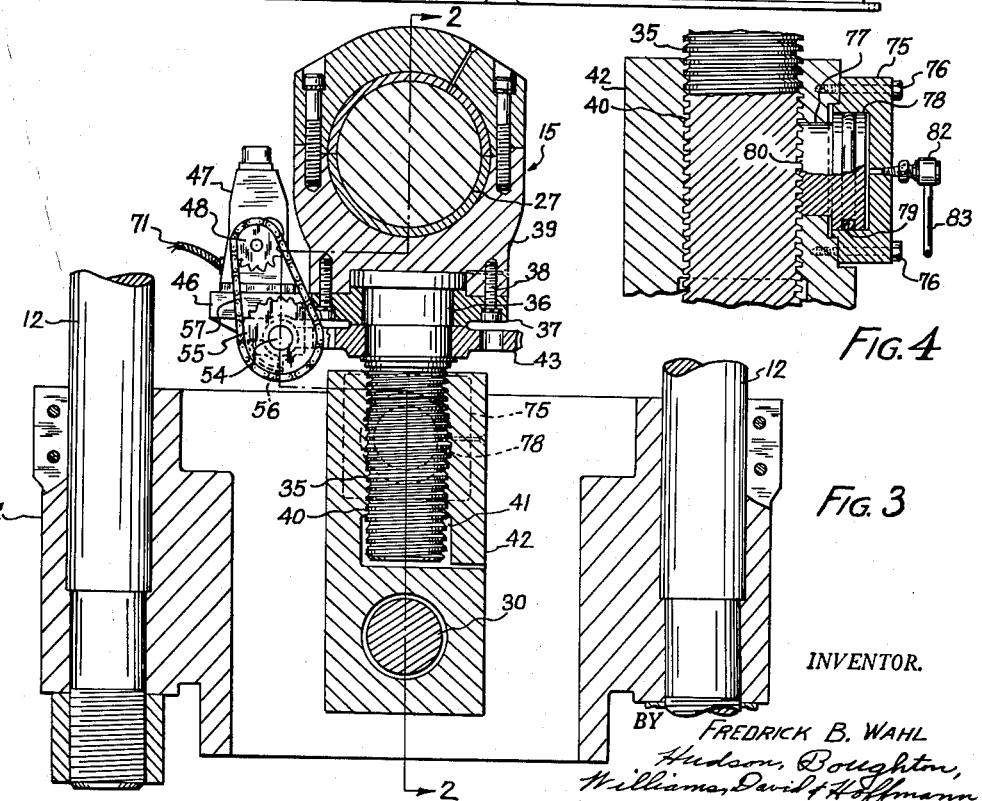
Fig. 4
Fig. 3
INVENTOR.
FREDRICK B. WAHL
BY Hudson, Boughton,
Williams, David & Hoffmann
ATTORNEYS

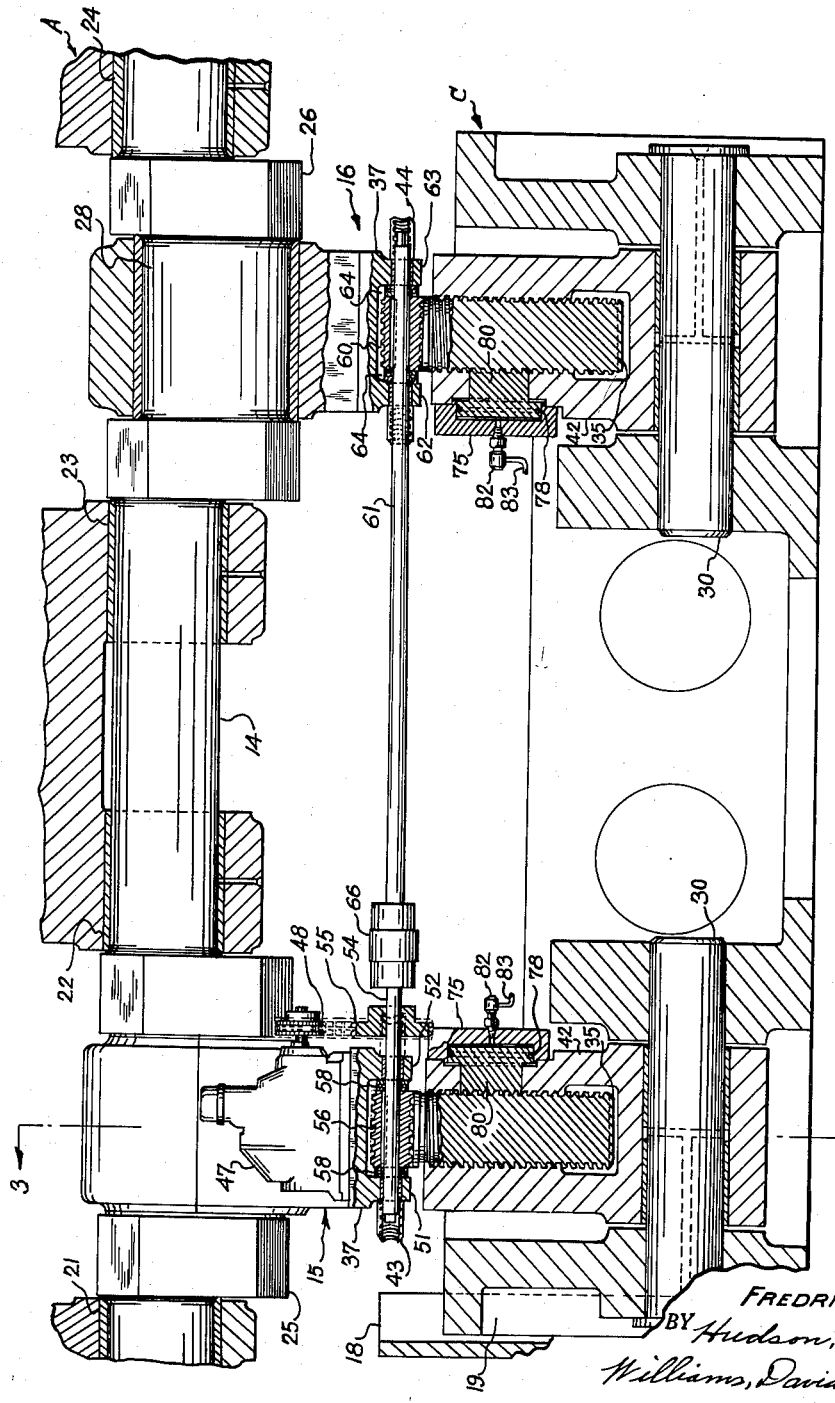

United States Patent Office 2,984,175
Patented May 16, 1961

2,984,175
PRESS

Fredrick B. Wahl, Parma, Ohio, assignor to Frank A. Brandes, Sr., Shaker Heights, Ohio Filed June 11, 1959, Ser. No. 819,754

2 Claims. (Cl. 100—257)

This invention relates to crank operated machinery or apparatus such as power presses or the like, and more particularly to apparatus having a reciprocating member connected to a crankshaft through connecting rod or pitman means which is adjustable as to length to vary the position of the stroke of the reciprocating member.

One of the principal objects of the invention is to provide new and novel apparatus of the above mentioned character having reciprocating means such as a crosshead, plunger or the like for forming, extruding, or otherwise acting on material, in which the reciprocating means derives its motion from rotary crankshaft means through adjustable connecting rod or pitman means having a motor drive arrangement mounted on the pitman means for providing accurate and convenient adjustment of the length thereof under the control of valves or switches which are remote from the motor, thereby allowing the adjustment to be effected without difficulty even in rather extensive apparatus having the pitman means enclosed or otherwise relatively inaccessible, as when in motion.

Another of the principal objects of this invention is to provide novel and new crankshaft operated apparatus such as presses or the like having adjustable connecting rods or pitmans which are variable in length, and where the adjustment is achieved through the agency of reversible motor means such as remotely controllable electric or pneumatic motors, the adjustable connecting rods including rotatable adjusting screw means operatively connected to the motor means and which connecting rods include remotely controllable fluid pressure operated locking or clamping means thereon adapted to releasably secure the screw means against rotation at times other than during adjustment.

As a further object the invention aims to provide novel and more useful apparatus of the general kind referred to above having crankshaft and adjustable connecting rod reciprocable crossheads, tool carriers, or the like, and wherein a plurality of screw adjustable pitmans or connecting rods may be included together with means such as reduction gearing, shafting and the like, whereby the adjusting screws of the pitmans may be driven in unison from a single remotely controlled motor for uniformly and simultaneously changing the lengths of the connecting rods so that the end positions of the stroke of the reciprocable crosshead or tool carrier may be varied without disturbing the angular or parallel relation or attitude thereof with respect to other portions of the apparatus such as cooperating tools and guideways.

The invention resides in certain novel features in the construction and arrangement of parts, and further objects and advantages will be apparent from the following detailed description of the hereafter described illustrative embodiment taken together with the accompanying sheets of drawings forming a part of this specification, and in which:

Fig. 1 is a front view, partly in section, of a portion of a power press embodying this invention, Fig. 2 is an enlarged sectional view of a portion of the press illustrating this invention, taken along line 2—2 of Fig. 3, Fig. 3 is a sectional view of an adjustable connecting rod or pitman and some of its associated mechanisms, taken along line 3—3 of Fig. 2, and Fig. 4 is an enlarged sectional view of a portion of an adjustable connecting rod.

Although the invention may be embodied in apparatus employing single or plural throw crankshafts in combinations with single or plural pitmans or connecting rods, for the purposes of illustration a power or stamping press having a two throw crankshaft and plural connecting rods, is shown and described herein.

The press shown has a somewhat rectangular or boxlike frame indicated generally at A, which frame presents a horizontal table or upper surface 10. The surface 10 is adapted to support fixed tools or dies (not shown) which may be secured to that surface in a conventional fashion.

An upper or outer crosshead B is supported in a spaced and parallel relation to the upper surface 10 of the frame A and is substantially coextensive therewith. The crosshead B is adapted to carry tools such as punches or the like for cooperation with the fixed dies on the surface 10, and derives its support from a plurality of vertical rods 12 which extend through the top 10 of the frame A and connect with drive means including a lower crosshead C. The latter is connected to a crankshaft 14 by pitmans or connecting rods 15 and 16, later described in detail, for reciprocating the crosshead B toward and away from the previously mentioned fixed dies. The use of a number of spaced rods 12 distribute the forces imposed on the crosshead B, thereby permitting the use of relatively light construction without likelihood of distortion and misalignment of tools.

The frame A is provided with means for aiding in guiding the inner or lower crosshead C which is mounted for reciprocating motion in the frame. The guiding means in this instance includes a plurality of vertical guides such as 18 secured to the frame A, and guideways 19 formed on the crosshead C and in sliding engagement with the guides 18. The crossheads B and C are joined by the rods 12 for motion as a unit, and the guides and ways 18 and 19 serve to constrain the crossheads to vertical linear motion without disturbing their parallel relation to the surface 10.

The crankshaft 14 is mounted for rotation in suitable bearings 21, 22, 23 and 24 in the frame A, and is provided with two throws 25 and 26 each having a crankpin as at 27 and 28. The crankpins 27 and 28 are engaged by the adjustable connecting rods 15 and 16 respectively, the connecting rods in turn being pivotally connected to the lower crosshead C by through or wrist pins 30.

The crankshaft 14 extends from one end of the press and is rotated by a power source preferably through a pedal controlled clutch and brake mechanism indicated generally at D, and which mechanism may conveniently be of the one revolution variety. The crankshaft rotating mechanism D is provided with a flywheel 32 and is supported in part by an upright bearing support member 33 mounted on the base of the frame A. The flywheel 32 may be rotated as by a belt and electric motor. Such power delivery arrangements are well known in the art and will not be further described herein. The rotation of the crankshaft 14 imparts uniform reciprocating motion to the upper and lower crossheads B and C between end positions of a stroke as determined by the length of the adjustable connecting rods 15 and 16.

The adjustable connecting rods 15 and 16 each comprise a threaded screw member 35 having a flanged head 36 rotatably carried in a retaining member 37, which is secured by screws 38 to a two-part bearing box 39 surrounding the crankpin 27. The rotatable screw members 35 are engaged with complementary screw threads 40 formed in the bores 41 of elongated nut members 42, through which the pivot or wrist pins 30 extend to join the connecting rods to the crosshead C.

Keyed to the adjusting screws 35, between the retaining members 37 and the nut members 42 of the connecting rods 15 and 16, are horizontally disposed wormwheels 43 and 44 respectively, which are adapted to be driven to rotate the screws within the nut members 42. Rotation of the screws 35, by means which will presently be described, will effect a lengthening or shortening, depending on the direction of rotation, of the pitmans or connecting rods 15 and 16, to thereby adjust or determine the end positions of the stroke of the crossheads B and C.

The retaining member 37 of the connecting rod 15 has formed therewith and extending substantially horizontally therefrom, a platform 46 which serves as a support for a connecting rod adjusting motor 47 having a rotary drive shaft carrying a chain drive sprocket 48. Formed also with the retaining member 37 of connecting rod 15, and extending beneath the platform 46, is a pair of shaft supporting arms 51 and 52. A shaft 54 having a sprocket 55 secured thereto is suitably journaled for rotation in the aligned arms 51 and 52, and a worm gear 56 is secured to that shaft between the support arms 51 and 52. A chain 57 joints the sprockets 48 and 55 and serves to connect the motor 47 in driving relation with the shaft 54. The worm gear 56 is secured for rotation with the shaft 54, between suitable thrust bearings 58 adapted to react against the arms 51 and 52, and is in mesh with the worm wheel 43. It will be apparent that operation of the motor 47 will, through the chain drive and gear means just described, rotate the screw 35 of the connecting rod 15 to change the length thereof.

Apparatus involving more than a single pitman or connecting rod for reciprocating a tool carrier, crosshead, or the like, of which the herein described press embodying the invention is an example, may advantageously have the pitmans or connecting rods thereof adjusted in unison to preserve the parallel relation of the reciprocating crosshead or the like with respect to other portions of the apparatus. In this press, the adjustment of the connecting rods 15 and 16 is effected simultaneously by a single reversible motor 47, to vary the shut height, or closest approach of the crosshead B to the table or surface 10 which will be experienced during operation of the press, without disturbing the parallel position or attitude of that crosshead with respect to the surface 10.

The connecting rod 16 has gearing associated with it to rotate its adjusting screw 35 simultaneously with that of the connecting rod 15. In mesh with the worm wheel 44 is a worm gear 60, secured for rotation with a shaft 61 which is rotatably journaled in a pair of shaft supporting arms 62 and 63. The latter are conveniently formed with the screw retaining member 37 of the connecting rod 16, and thrust bearings 64 are advantageously interposed between the ends of the worm gear 60 and those shaft supporting arms. The shafts 54 and 61 are joined for rotation in unison by a coupling 66 which may advantageously be somewhat flexible.

The reversible rotary motor 47, which is mounted on the pitman 15, may be hydraulic or electric but is preferably of the pneumatic variety, and because of the reducing action of the sprockets 48, 54 and the chain 57, and of the gearing linking the motor to the rotatable adjusting screws 35, the motor may be one of relatively small power. Operation of the motor 47 to adjust the pitmans is advantageously controlled by a remote valve or switch which is located at some convenient place such as on the panel 70 mounted on the frame A as seen in Fig. 1. Preferably the motor is connected to the control panel 70 through suitable flexible conduit means 71. The flexible conduit 71 permits remote adjustment from the control panel 70 of the pitmans 15 and 16, which in this press are within a frame and relatively inaccessible. Likewise the flexible conduit 71 permits the adjustment of pitman length when the press, or other apparatus embodying the invention, is operating. Adjustments as to shut height, effective pressure of the crosshead B, or the like may be made with speed and precision, a check being obtainable upon each stroke of the press or other apparatus.

A locking or clamping means is included as part of each of the connecting rods to secure the adjusting screw elements 35 against rotation during use of the press. As may be seen in Fig. 4, a short cylinder 75 is mounted on the elongated nut member 42 preferably by means of screws 76 and is axially aligned with a transverse opening 77 in the nut member 42. Within the cylinder 75 is a movable piston 78 having an annular packing or piston ring 79 in sealing engagement with the walls of the cylinder. The piston 78 has extending therefrom, and through the opening 77, a screw clamping element or portion 80.

The clamping element 80 has threads thereon which are continuations of the threads 40 in the nut member 42 having engagement with the threaded member 35. A fluid pressure supply fitting 82, in the form of a swivel connection and having a conduit 83 leading thereto, is in communication with the interior of the cylinder 75. The conduit 83 extends through flexible means, not shown, to a source of fluid pressure such as air or the like through a suitable control valve which is preferably conveniently located on the control panel 70. When the adjustable connecting rod has been brought to the desired length by the adjusting screw motor 47, fluid pressure is applied via the conduit 83 to the interior of the cylinder 75 where it acts on the piston 78 to force the screw engaging or clamping element 80 into a binding condition against the screw 35. The screw 35 is thereby effectively locked or clamped against any undesirable rotation such as might be induced under the influence of vibration or other forces resulting from operation of the press. Conversely, to release the lock or clamping element 80, the fluid pressure is released from the cylinder 75.

The rods 12 connecting the crossheads B and C are preferably provided with telescoping shields 90 to protect them from being damaged, and are advantageously guided in their passage through the surface 10 by adjustable sleeves or guides 92, though these are not material to this invention.

It will be apparent from the foregoing description that there has been provided by this invention novel features of construction by which the previously indicated objects, as well as others, have been achieved, and that apparatus such as presses of the like embodying this invention are versatile in use yet practical and reliable in form.

Although a press having a multi-throw crank has been described in some detail, it will be understood that the invention is not to be limited thereby, but in practice includes those changes and modifications as are embraced by the scope of the appended claims.

Having thus described my invention, I claim:

1. In an apparatus of the character described having a frame, reciprocable means supported by said frame and adapted to act on material during reciprocation, a crankshaft rotatably supported by said frame, adjustable connecting rod means connecting said crankshaft and said reciprocable means for motion of said reciprocable means between predetermined positions upon rotation of said crankshaft, said adjustable connecting rod means including a nut member and a rotatable adjusting screw means, a reversible motor means operatively connected to said screw means whereby said adjustable connecting rod means may be lengthened or shortened to vary said predetermined positions, and fluid pressure operable locking means for securing said screw means against rotation, said locking means comprising a fluid pressure cylinder mounted on said nut member, said nut member having a transverse opening in alignment with said cylinder, a piston reciprocable in said cylinder in response to fluid pressure therein, and a locking element disposed in said opening and movable therein by said piston, said locking element being in engagement with said screw means whereby fluid pressure in said cylinder will actuate said piston to force said locking element into binding relation with said screw means to prevent rotation thereof in said nut member.

2. A power press of the character described having a frame presenting an elongated upper surface for supporting dies or the like, a first crosshead mounted for reciprocation in said frame, a second crosshead parallel with and substantially coextensive with said first crosshead and said surface, said first and second crossheads connected for reciprocation as a unit, said second crosshead being adapted to carry tools toward and away from said surface, a crankshaft rotatably supported by said frame and having first and second throws for reciprocation of said crossheads between predetermined positions, first and second adjustable connecting rods connecting said first and second crankshaft throws respectively to said first crosshead and having oscillatory paths of travel, said connecting rods each including a nut member and a rotatable screw means for adjusting the length thereof, a reversible motor mounted on said first connecting rod, gear means operatively connecting said motor to each of said screw means whereby the length of said first and second connecting rods may be adjusted in unison to vary said predetermined positions while maintaining said crossheads parallel with said upper surface, and fluid pressure operated clamping means on each of said first and second connecting rods, said clamping means each comprising a fluid pressure cylinder mounted on one of said nut members, said nut members each having a transverse opening in alignment with the cylinder thereon, a piston, reciprocable in each of said cylinders in response to fluid pressure therein, and a locking element disposed in each of said openings and movable therein by said pistons, said locking elements being in engagement with said screw means whereby fluid pressure in said cylinders will actuate said pistons to force said locking elements into binding relation with said screw means to prevent rotation thereof in said nut members.

References Cited in the file of this patent
UNITED STATES PATENTS

| | | |
|---|---|---|
| 1,768,504 | Byerlein | June 24, 1930 |
| 2,185,096 | Treer | Dec. 26, 1939 |
| 2,532,320 | Maussnest | Dec. 5, 1950 |